E. A. MENCZER.
ROD PACKING.
APPLICATION FILED OCT. 17, 1908.
927,156.
Patented July 6, 1909.
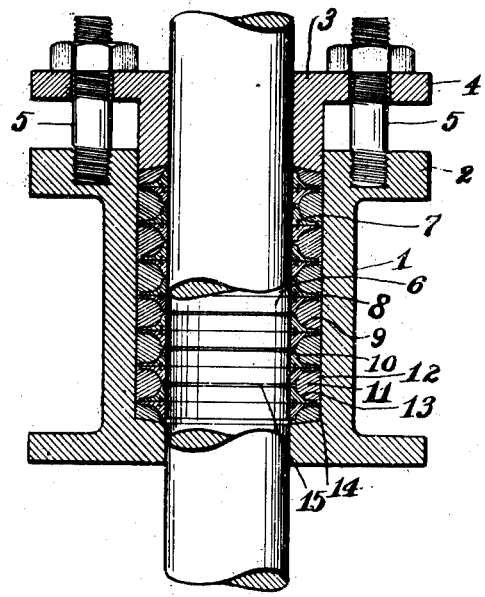
Fig. I.
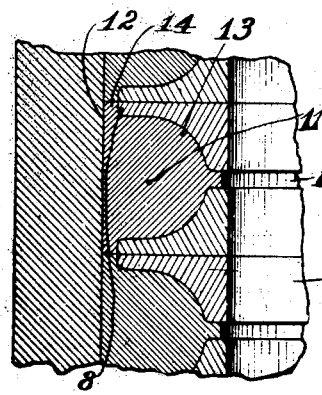
Fig. II.
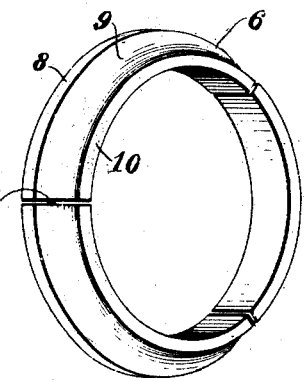
Fig. III.
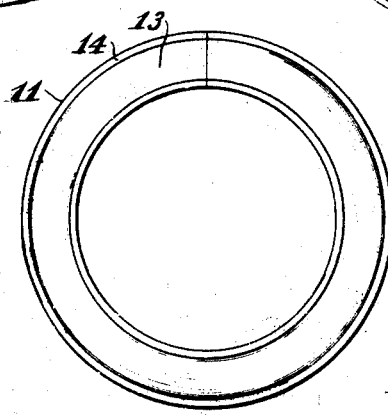
Fig. IV.
WITNESSES:
R. Hamilton.
Myrtle M. Jackson.
INVENTOR.
Edward A. Menczer.
BY
Arthur C. Brown
ATTORNEY.

UNITED STATES PATENT OFFICE.

EDWARD A. MENCZER, OF KANSAS CITY, MISSOURI, ASSIGNOR, BY MESNE ASSIGNMENTS, TO THE ENGINEERS SPECIALTY COMPANY, A CORPORATION OF MISSOURI.

ROD-PACKING.

No. 927,156.      Specification of Letters Patent.      Patented July 6, 1909.

Application filed October 17, 1908. Serial No. 458,315.

*To all whom it may concern:*

Be it known that I, EDWARD A. MENCZER, a citizen of the United States, residing at Kansas City, in the county of Jackson and State of Missouri, have invented certain new and useful Improvements in Rod-Packing; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to metallic packing and has for its object to provide a packing for piston and like rods which will effectually prevent the escape of steam, or the like, through the stuffing boxes in which it is applied, without interfering with the operation of the piston.

A further object of my invention is to provide a metallic packing which may be tightened to compensate for wear.

In accomplishing these objects, I have provided the improved details of structure presently described and illustrated in the accompanying drawings, in which;—

Figure I is a longitudinal sectional view of a stuffing box, equipped with my improved packing. Fig. II is an enlarged sectional view of same. Fig. III is a perspective view of one of the metallic packing rings. Fig. IV is a plan view of one of the resilient packing members.

Referring more in detail to the parts:—1 designates a stuffing box, having the riveting flanges, 2, and 3 a gland that is provided with a riveting flange 4, such parts being of any ordinary construction and adapted for coöperation in the usual manner, the flanges 2 and 4 being united by the tightening bolts 5.

6 designates metallic packing rings each of which is preferably formed in sections that are united by embodying a strand 7 therein during the molding process. Each of rings 6 is provided with a projecting base flange 8, and with a concaved seat 9 on its outer surface between the edge of flange 8 and the body of the ring, which groove is adapted for receiving a portion of the resilient member, presently described.

In order to impart stability to the metal ring and for other reasons, presently set forth, the ring body is of greater width at its exposed surface (numeral 10) than is the free edge of the flange 8, and the flange is of substantially greater diameter than the ring body, to provide for the peripheral groove and to enable a packing ring to coöperate with a mating ring and with a resilient packing member, when the parts are assembled.

11 designates the resilient packing members which are preferably composed of rubber and have the flat bases 12 and convexly curved breasts 13, the latter being adapted to fit within peripheral grooves of the metal rings. At each base edge of the member 11 is a flange member 14 which projects outwardly a distance substantially equal to the width of the ring flange 8, and projecting from the center of the breast portion is a lip 14 which is of substantially the same width as the flanges 12. The rings 6 may be cast of any diameter to fit any particular stuffing box and piston, so that by breaking the strand 7 between two of the ring sections, the ring may be placed over the piston rod and fitted into the box, the resilient members being, if desired, formed in convenient lengths and cut to form the individual packing members.

In packing the rod, one of the resilient members 11 is split longitudinally and placed in the bottom of the stuffing box with the edge flange 12 projecting upwardly, and the breast lip toward the box center. One of the metal rings is then fitted over the piston rod and moved into contact with the resilient member so that the breast of the latter will fit into the ring groove to form a close contact with the parts, the inner diameter of the ring being in close contact with the piston rod and a space 15 being left on the top of the ring body because of the lesser width of the breast lip. A second metal ring is then placed over the piston rod and lowered until the flat surface of its body and flange engage like portions of the preceding ring. A full resilient member is then placed into position and the packing built up in this manner until the chamber of the box has been filled, the metal rings being in contact, at their extended surfaces, and the contact of the grooved sides of the rings being broken by the resilient members and the lips 14, as illustrated.

By reason of the breaks in the packing, formed by the breast lips of the resilient members, we not only provide for expansion and contraction of the metal rings, but also provide for lubrication, as oil may be received into the recesses 15 between the packing units during the operation of the piston.

When the packing is first applied, the engine may be run for a short time without complete tightening of the gland in order to give the packing an opportunity to set, after which the gland may be tightened by means of the bolts 5. After the packing has been in use for some time, should the rings wear or the parts become loosened, a further tightening of the bolts 5 will restore the parts to their former condition, such tightening being repeated, when necessary, without the necessity of removal of the gland or any part of the packing.

Having thus described my invention, what I claim as new therein and desire to secure by Letters-Patent is:—

1. A rod packing comprising a ring member having a body portion adapted for engagement with a piston rod, and having a laterally projecting base flange, one face of said ring being flat and on the opposite face concaved, and a resilient member, having a flat base adapted to seat against the inner surface of a stuffing box and provided with a breast adapted to seat in the grooves of adjoining ring members, said resilient member being provided at its base with transverse flanges, and at the breast portion with a lip, substantially as and for the purpose set forth.

2. The combination with a stuffing box and piston rod, of metallic ring members surrounding said rod and provided with flat bases and with concaved grooves on the sides opposite said bases, and relatively resilient members seated against the stuffing box and having breasts seated in the concaved grooves of adjoining rings, said resilient members being provided with breast lips whereby adjoining rings are separated from each other, and with base flanges whereby said rings are separated from the stuffing box.

3. The combination with a stuffing box and piston rod, of metallic ring members having flat bases and concaved grooves opposite said bases, said rings being arranged in pairs with the flat bases of the rings of each pair in contact, resilient members located between adjoining ring pairs and having base portions in contact with the stuffing box and breasts seated in the grooves of ring members of adjacent ring pairs, said resilient members being provided with base flanges that separate the ring bases from the stuffing box and with breast lips that separate the rings of adjacent pairs, said breast lips being narrower than the ring body to provide lubricant grooves, substantially as set forth.

In testimony whereof I affix my signature in presence of two witnesses.

EDWARD A. MENCZER.

Witnesses:
MYRTLE M. JACKSON,
F. A. CAHILL.